Patented Dec. 16, 1952

2,622,083

UNITED STATES PATENT OFFICE 2,622,083

TRIPHOSPHORIC ESTER OF ANEURIN AND PROCESS OF PREPARATION

Léon Velluz, Paris, Gaston Amiard, Romainville, and Jaroslav Bartos, Paris, France, assignors to Usines Chimiques des Laboratoires Francais, Paris, France, a body corporate of France No Drawing. Application September 21, 1948, Serial No. 50,432. In France December 26, 1947

6 Claims. (Cl. 260—256.6)

The present invention relates to a new and useful ester of vitamin $B_1$ (aneurin) and the process of preparing the same and, more particularly, to the triphosphoric acid ester of vitamin $B_1$ (aneurin) and its preparation.

In accordance with a simplified modification of the Weijlard-Tauber procedure (C. A. 32, 8640, 3440) co-carboxylase (aneurin pyrophosphate) was prepared by P. Karrer and M. Visconti (Helvetica Chim. Acta 29, 711–718 (1946)) whereby a better yield and a purer product were obtained. In accordance with the present invention, however, the triphosphoric ester of vitamin $B_1$ is prepared based upon the use of orthophosphoric acid as the phosphorylating agent.

In general, the present invention comprises the phosphorylation of vitamin $B_1$ (aneurin) by means of orthophosphoric acid as the phosphorylating agent, followed by a separation of the triphosphoric acid ester from the phosphorylated reaction products through a selective precipitation by means of styphnic acid (trinitroresorcinol) which has the following formula:

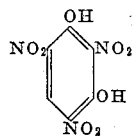

By phosphorylating vitamin $B_1$ with orthophosphoric acid and separating the triphosphoric acid ester of vitamin $B_1$ from the phosphorylated reaction mixture, a white micro-crystalline product is obtained which has not heretofore been known or described. This new ester of vitamin $B_1$ possesses a physiological activity just like the pyrophosphoric acid ester of vitamin $B_1$ (which is best known under the name of co-carboxylase) but to a very markedly greater extent. The new triphosphoric acid ester of vitamin $B_1$ is characterized by the fact that it contains three atoms of phosphorus of which two only can be liberated by acid hydrolysis with the formation of phosphoric acid. The alkaline saponification followed by acid hydrolysis liberates the entire amount of phosphorus. Prior to hydrolysis in aqueous solution, there are practically no phosphoric ions.

Analysis gives the following results:

|  | Found, Percent | Calculated for: $C_{12}H_{19}O_{10}N_4SP_3$, $2H_2O = 540.4$ |
| --- | --- | --- |
| P ionizable | 0.54–0.58 | 0 |
| P acid-hydrolyzable | 11.05–11.5 | 11.5 |
| P total | 17.1–17.2 | 17.2 |
| N | 10.3 | 10.4 |

These results lead to attributing to this new compound the following constitution:

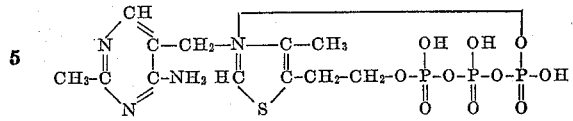

Example

There is warmed in a wide neck bottle 125 grams of orthophosphoric acid until a cloudiness or turbidity appears and then crystals. The temperature is then in the neighborhood of 340° C. After cooling to about 150° C., there is added 100 grams of vitamin $B_1$ hydrochloride under agitation. The temperature is maintained at 145–150° C. for an hour. Then the heating is discontinued and the residue taken up in 1250 cc. of water. The filtered aqueous solution is added to 900 cc. of acetone containing 75 grams of styphnic acid. There is then added 2850 cc. of additional acetone. After standing overnight, the oil which has separated is decanted, then dissolved in 375 cc. of water. There is added to the aqueous solution some decolorizing black. The solution is filtered and the oil is re-precipitated by 2000 cc. of acetone. After two days the oil is decanted and submitted to a second similar treatment. It is finally triturated with a mixture of equal parts of acetone and absolute alcohol whereupon crystallization occurs. The following additional treatments are then usually carried out—i. e., centrifuging, washing and drying. The yield is in the neighborhood of 30% of theoretical calculated on the amount of vitamin $B_1$ put into the reaction.

This process of fractionation by styphnic acid can be applied with the same result when the phosphorylation has been effected not only upon vitamin $B_1$ hydrochloride but upon other salts such as the phosphate.

The triphosphoric acid ester of aneurin exerts a typical effect upon the electric inhibition of the heart and, in particular, upon the period of auriculo-ventricular dissociation which precedes the resumption of normal cardiac activity. One may attribute to this fact its remarkable action upon the functional state of the myocardium and, probably, upon the intrinsic nervous system of the heart. On the other hand, triphosphoric acid ester of aneurin has anti-fibrillatory properties which are manifested, shortly after injection, by an increased heart beat. The intro-cardiac injection of the new compound may, in effect, cause the reappearance of the beat of hearts which have been affected by fibrillation for a certain time and, therefore, partically given up as fatal. The protective effect may last several hours with a dose of 10 mg. per kg. In contrast thereto, with vitamin $B_1$ or cocarboxylase, the action is less intensive and, in particular, of less duration, 15 minutes at the maximum with a dose of 10 mg. per kg.

The invention is not limited to the details of execution described above which are given only by way of example.

We claim:

1. The ester of vitamin $B_1$ represented by the following formula:

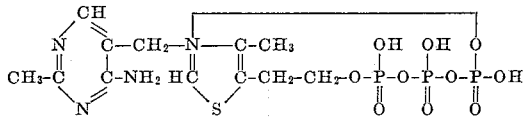

2. In a process of preparing the triphosphoric acid ester of vitamin $B_1$, the steps comprising reacting at a temperature between about 145° C. and about 150° C., the hydrochloride of vitamin $B_1$ with a product obtained by heating orthophosphoric acid to a temperature of about 340° C. to turbidity and the formation of crystals, dissolving in water the reaction mixture containing the triphosphoric acid ester of vitamin $B_1$ thus formed, adding the resulting solution to a solution of styphnic acid in acetone, separating the oil precipitated thereby, dissolving said oil in water, decolorizing the solution formed thereby and crystallizing the triphosphoric acid ester of vitamin $B_1$ from acetone and absolute alcohol.

3. In a process of preparing the triphosphoric acid ester of vitamin $B_1$, the steps comprising reacting, at a temperature between about 145° C. and about 150° C., the phosphate of vitamin $B_1$ with a product obtained by heating orthophosphoric acid to a temperature of about 340° C. to turbidity and the formation of crystals, dissolving in water the reaction mixture containing the triphosphoric acid ester of vitamin $B_1$ thus formed, adding the resulting solution to a solution of styphnic acid in acetone, separating the oil precipitated thereby, dissolving said oil in water, decolorizing the solution formed thereby and crystallizing the triphosphoric acid ester of vitamin $B_1$ from acetone and absolute alcohol.

4. In a process of preparing the triphosphoric acid ester of vitamin $B_1$, the steps comprising reacting, at a temperature between about 145° C. and about 150° C., an acid salt of vitamin $B_1$ with a product obtained by heating orthophosphoric acid to a temperature of about 340° C. to turbidity and the formation of crystals, dissolving in water the reaction mixture containing the triphosphoric acid ester of vitamin $B_1$ thus formed, adding the resulting solution to a solution of styphnic acid in acetone, separating the oil precipitated thereby, dissolving said oil in water, decolorizing the solution formed thereby and crystallizing the triphosphoric acid ester of vitamin $B_1$ from acetone and absolute alcohol.

5. A process of preparing the triphosphoric acid ester of vitamin $B_1$ which comprises the steps of phosphorylating, at a temperature between about 145° C. and about 150° C., vitamin $B_1$ with a product obtained by heating orthophosphoric acid to a temperature of about 340° C. to turbidity and the formation of crystals, dissolving the reaction mixture containing the triphosphoric acid ester of vitamin $B_1$, thus formed, in water, and precipitating said ester by means of acetone in the presence of styphnic acid.

6. In a process of preparing the triphosphoric acid ester of vitamin $B_1$, the steps comprising reacting vitamin $B_1$ at a temperature between about 145° C. and about 150° C. with a product obtained by heating orthophosphoric acid to a temperature of about 340° C. to turbidity and the formation of crystals, dissolving the reaction mixture containing the triphosphoric acid ester of vitamin $B_1$ thus formed, in water, adding such solution to a solution of styphnic acid in acetone, separating the oil thus formed, dissolving said oil in water, and recovering the triphosphoric acid ester of vitamin $B_1$ from said aqueous solution by precipitation and recrystallization.

LÉON VELLUZ.
GASTON AMIARD.
JAROSLAV BARTOS.

REFERENCES CITED

The following references are of record in the file of this patent:

UNITED STATES PATENTS

| Number | Name | Date |
|---|---|---|
| 2,435,750 | Maizel et al. | Feb. 10, 1948 |

OTHER REFERENCES

Viscontini et al., Helv. Chim. Acta. 32, 1478–1484 (1949).

Velluz et al., Chemical Abstracts, 42, 5066a (1948), citing Compt. Read. 226, 735–736 (1948).